United States Patent [19]
Horner

[11] Patent Number: 4,643,625
[45] Date of Patent: Feb. 17, 1987

[54] HAY-HAULING TRAILER

[76] Inventor: Robert G. Horner, Rte. 3, Box 320, Pine City, Minn. 55063

[21] Appl. No.: 745,790

[22] Filed: Jun. 17, 1985

[51] Int. Cl.$^4$ ............................................. B60P 1/04
[52] U.S. Cl. ..................... 414/24.5; 298/5; 298/20 R; 414/436; 414/473
[58] Field of Search ............ 414/24.5, 24.6, 434, 414/435, 436, 439, 473; 298/5, 20 R

[56] References Cited

U.S. PATENT DOCUMENTS

| | | | |
|---|---|---|---|
| 2,126,387 | 8/1938 | Hinds | 298/20 R X |
| 3,938,682 | 2/1976 | Rowe | 414/24.5 |
| 3,985,253 | 10/1976 | Kannady et al. | 298/5 X |
| 4,089,425 | 5/1978 | Baltz | 414/24.5 |
| 4,215,963 | 8/1980 | Doner | 298/20 R X |
| 4,326,827 | 4/1982 | McNutt | 414/436 X |
| 4,411,573 | 10/1983 | Townsend | 414/24.6 |

Primary Examiner—Robert J. Spar
Assistant Examiner—Janice Krizek
Attorney, Agent, or Firm—Thomas B. Tate

[57] ABSTRACT

The invention is a hook and latch assembly for hauling hay, the device being mounted on a trailer axle and comprising a front assembly, a rear assembly, attached to the front assembly, and a hook assembly pivotally attached to the rear assembly by means of a swing bar latch and hinge bolt which allows the hook assembly to be raised and lowered to pick up and haul bales of hay.

2 Claims, 10 Drawing Figures

HAY-HAULING TRAILER

SUMMARY AND BACKGROUND OF THE INVENTION

The invention is a device for hauling hay. Most hay-hauling devices currently marketed are either chain-driven balers or tractors with a front-end hayfork.

The present invention, however, is a hook and latch assembly which can be connected to a towing vehicle, such as a pickup truck or a car.

The object of the invention is to provide a device for hauling hay that is more efficient, easier to use, and cheaper to build than devices currently available.

DESCRIPTION OF THE PREFERRED EMBODIMENT OF THE INVENTION

Figure 1:
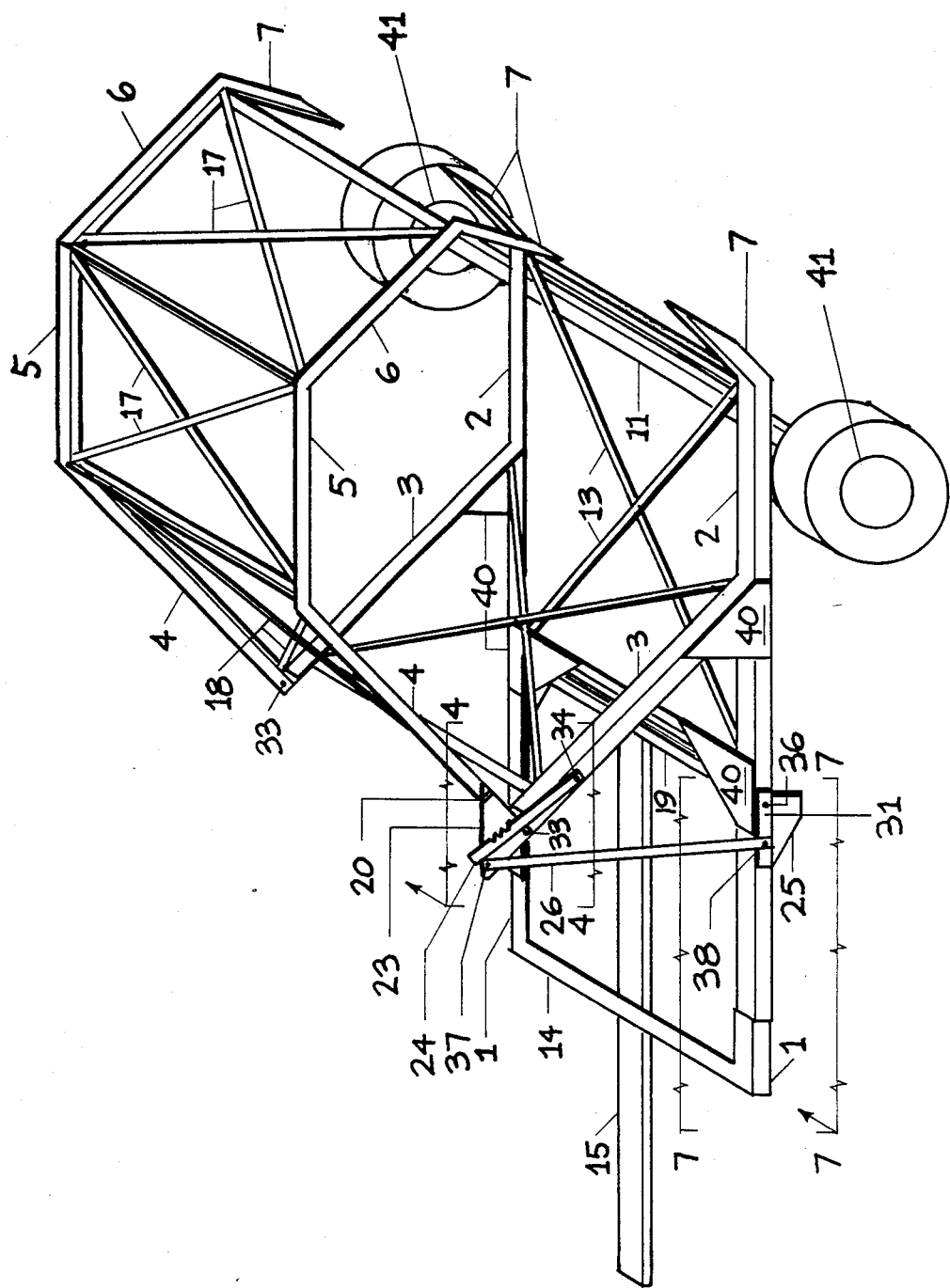
FIG. 1 is a side view of the device in closed position.

The invention is a hook and latch assembly which can be connected to a towing vehicle, such as a car or a pickup truck, as a trailer to pick up bales of hay and haul them, one bale at a time.

The front assembly is a steel angle frame comprising two parallel side bars 1 connected to each other by front mainframe crossbar 14 and rear mainframe crossbar 19. The front assembly is also provided with a tongue 15, which is welded to rear crossbar 19 and to the underside of front crossbar 14, projects beyond front crossbar 14 in a forward direction, and hitches onto the truck by means of a standard trailer hitch.

The rear assembly is a steel angle frame comprising two parallel side bars 2 which are pivotally bolted to the front assembly, and the rear assembly is also welded onto the rear axle 11 of the trailer. The axle 11, which acts as a fulcrum, is a standard utility trailer axle with either electric or manual brakes 41. X-bracing 13 connects the parallel side bars 2. Each side bar 2 has formed at its rear end a hook tip 7. An angle flange 3 is welded to each side bar 2 at approximately a 45 degree angle, projecting forward. The two angle flanges 3 are connected to each other by X-bracing 12. Plates 40, two of which extend from the front assembly to the rear assembly and another two of which extend from the rear assembly to the angle flanges 3, are reinforcing plates.

The hook assembly is pivotally attached to the angle flanges 3 of the rear assembly. The hook assembly comprises a pair of parallel angle flanges 4, each of which is positioned at approximately right angles to its corresponding angle flange 3, said flanges 4 bend to become horizontal sides 5, then bend again at obtuse angles to become angle flanges 6, and bend again to culminate in hook tips 7. The large X-bracing 18 connects the sides 4 in the front section of the hook assembly, and the small X-bracking 17 connects sides 5 in the center section, and sides 6 in the rear section, of the hook assembly.

Figures 4, 5, 6:
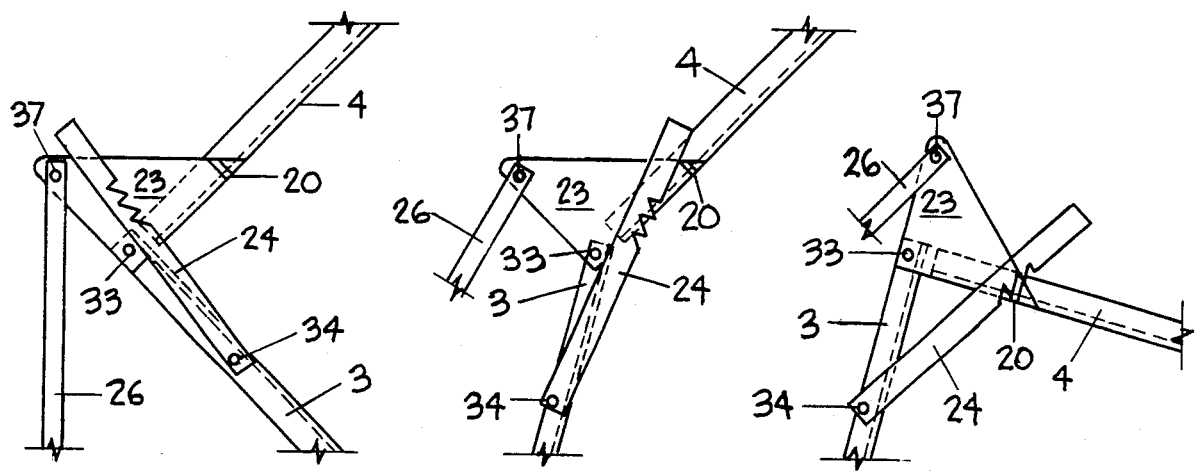
FIG. 4 is a detail view of the latch bar, with the device in the same position as in FIG. 1.
FIG. 5 is a detail view of the swing bar and connection of the front and rear assembly, with the device in the cocked position as in FIG. 2.
FIG. 6 is a detail view with the device in the same position as in FIG. 3.
Figure 7:
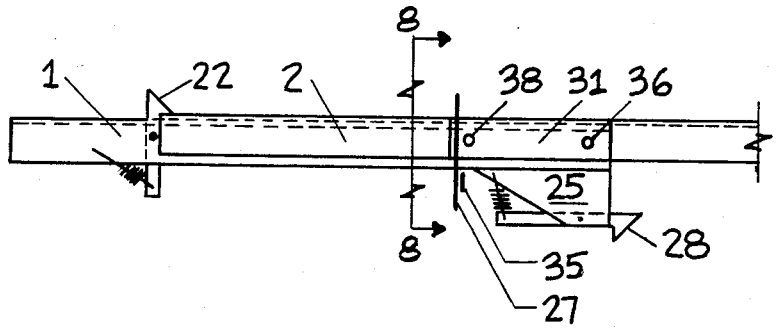
FIG. 7 is a detail view of the front and rear assemblies with the latch in the travel position, as in FIG. 1.
Figure 8:
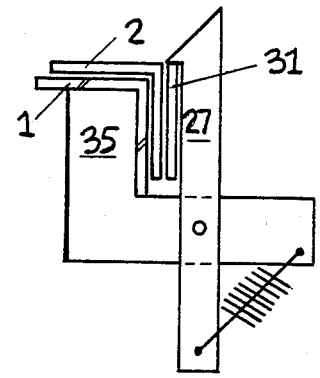
FIG. 8 is an inset detail of FIG. 7 taken as a cross-section along line 8—8.
Figures 9, 10:
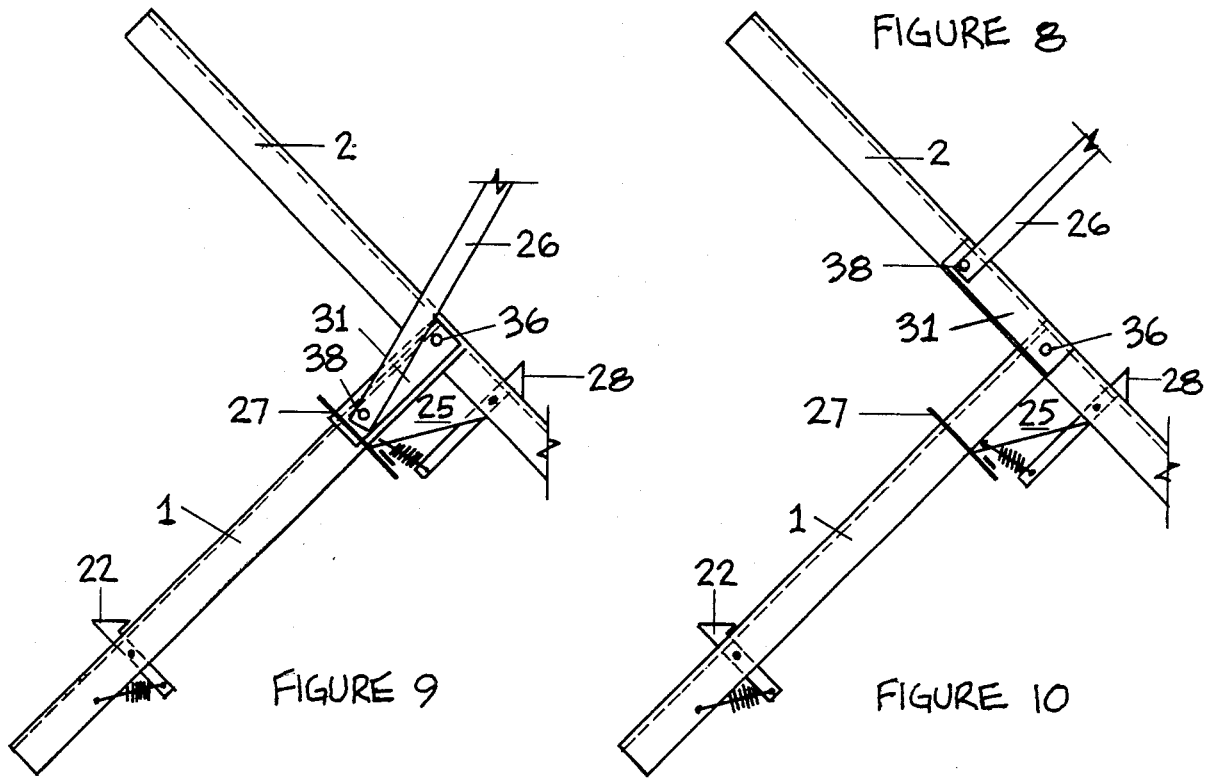
FIG. 9 is a detail view of the front and rear assemblies with the latch in the same position as in FIG. 2.
FIG. 10 is a detail view of the front and rear assemblies with the latch in the same position as in FIG. 3.

The device is provided with three latches and one latch bar. Latch 20 comprises a plate 23 welded onto the side of angle flange 4 at the junction with angle flange 3, a partially serrated latch bar 24 which is bolted onto angle flange 3 by bolt 34 and rests on bolt 33 and on latch-catch 20 and is held by a nut and lock washer on bolt 34. The bolt 33 pushes latch bar 24 into the position shown in FIG. 5. Latches 22, 27, and 28 are spring-loaded latches, and these three latches 22, 27, and 28 are self-latching and are electrically or manually released. Latch 27 is bolted onto plate 35, which is welded to the front assembly frame 1. Swing bar 31, which is bolted onto front assembly frame 1 by bolt 36, swings on bolt 36 to allow the hook assembly to drop. Vertical post 26 extends from latch plate 23 to swing bar 31 and is bolted to each, by bolts 37 and 38, respectively. Latch 27 holds the swing bar and hook assembly. Latch 28, which is bolted onto plate 25, holds the front and rear assemblies in the cocked position shown in FIG. 2. Latch 22 holds the front and rear assemblies in the travel position shown in FIG. 1.

Figure 2:
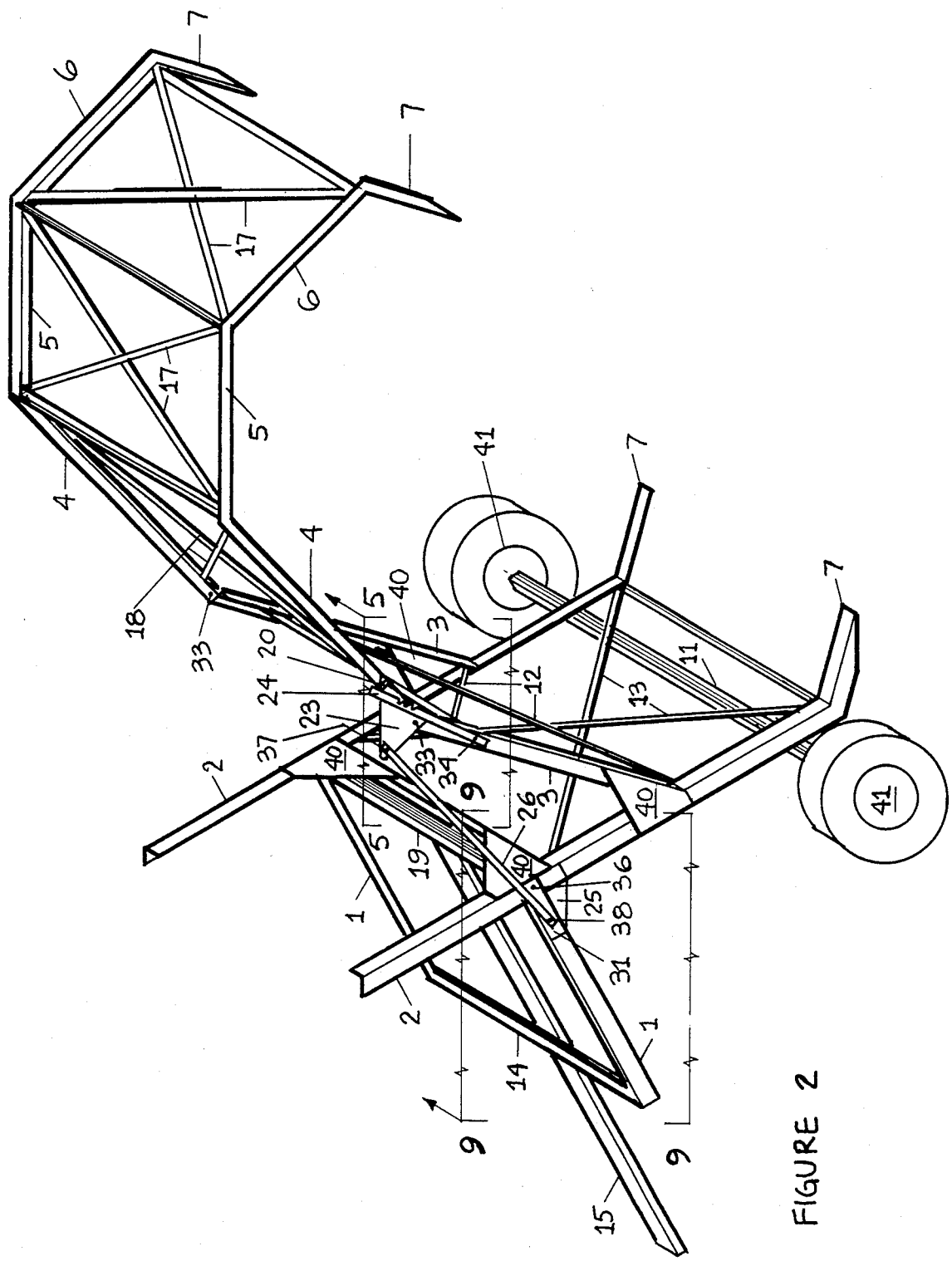
FIG. 2 is a side view of the device in cocked position.
Figure 3:
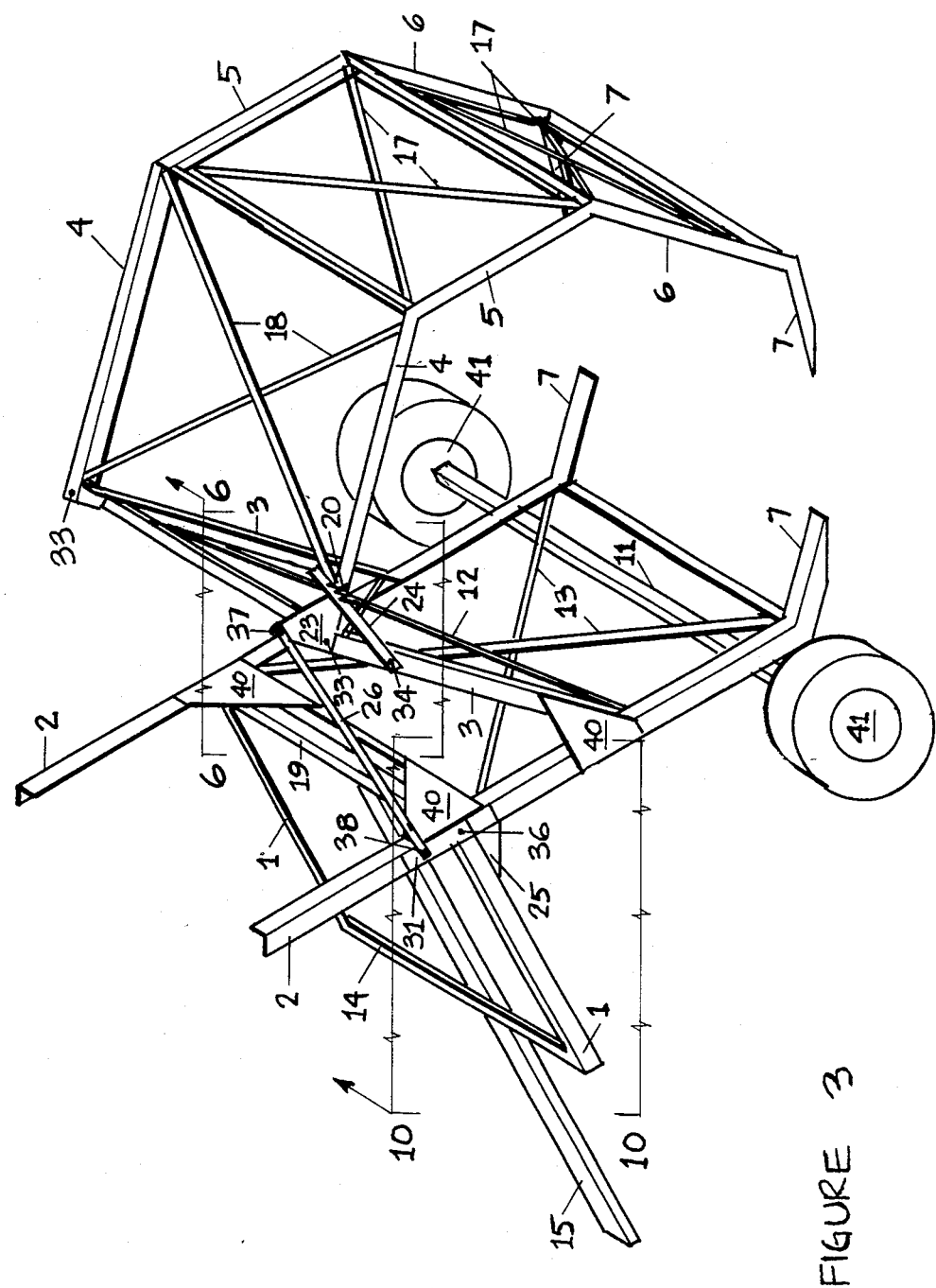
FIG. 3 is a side view of the deivce in lowered position.

The hook assembly comes up into cocked position shown in FIG. 2. when the trailer brakes 41 are locked, the latch 22 is released, and the truck is backed up. The brakes 41 are then released and the truck is backed up to the bale of hay. The latch 27 is released, and the hook assembly drops down into the position shown in FIG. 3 to hook the bale. The brakes 41 are then locked again, latch 28 is released, and the truck is pulled forwardly to raise the hook assembly back into the position shown in FIG. 1 to carry the bale of hay. To drop the bale of hay, the hook assembly is again brought into the cocked position shown in FIG. 2. To return to the position shown in FIG. 1, latch 28 is released, brakes 41 are locked, and the truck is pulled forwardly without releasing latch 27 and therefore without dropping the hook assembly.

I claim:

1. A self-loading hay-hauling trailer which can be hitched to a towing vehicle, said trailer comprising:

a generally rectangular angle frame front assembly which has a swing bar bolted onto it;

an angle frame rear assembly comprising parallel side bars pivotally attached to said front assembly and also attached to an axle of said trailer, said axle being provided with brakes, each of said parallel side bars culminating in a hook tip;

a hook assembly pivotally attached to said rear assembly, said hook assembly comprising a pair of parallel angle flanges having a front section, a horizontal center section at obtuse angles to said front section, and a rear section at obtuse angles to said center section, each of said flanges culminating in a hook tip;

a plurality of latching means to raise and lower said hook assembly to pick up and haul bales of hay, including a first latching means forming the pivotal attachment of said hook assembly to said rear assembly, said first latching means including a partially serrated latch bar which rests on a latch catch, a second latching means which holds said front and rear assemblies in a travel position, a third latching means mounted on said front assembly to latch said swing bar, and a fourth latching means which holds said front and rear assemblies in a cocked position, said second, third, and fourth latching means being spring-loaded latches.

2. The hay hauling trailer of claim 1 wherein a bale of hay is loaded onto, carried by and released from said trailer by means of:

locking said brakes of the trailer, releasing said second latch means, and backing up the towing vehicle, thereby bringing said hook assembly into said cocked position;

releasing said brakes and backing up the trailer to a bale of hay;

relesing said third latch means, thus dropping said hook assembly to hook the bale of hay;

locking said brakes again, releasing said fourth latch means, and pulling the towing vehicle forwardly to return said hook assembly to its original position to carry the bale of hay;

again locking said brakes, releasing said second latch means, and backing up the towing vehicle to bring said hook assembly into said cocked position to release and drop the bale of hay.

* * * * *